(12) United States Patent
Liu

(10) Patent No.: US 8,194,054 B2
(45) Date of Patent: Jun. 5, 2012

(54) LARGE SCREEN INFORMATION INTERACTIVE SYSTEM AND METHOD OF USE

(75) Inventor: Guohua Liu, Guangdong (CN)

(73) Assignee: Julong Educational Technology Co., Ltd., Shenzhen (CN)

(*) Notice: Subject to any disclaimer, the term of this patent is extended or adjusted under 35 U.S.C. 154(b) by 1207 days.

(21) Appl. No.: 11/956,874

(22) Filed: Dec. 14, 2007

(65) Prior Publication Data

US 2008/0309646 A1    Dec. 18, 2008

(30) Foreign Application Priority Data

Jun. 14, 2007 (CN) .............................. 200710074960

(51) Int. Cl.
*G06F 3/033* (2006.01)
(52) U.S. Cl. ....................................................... 345/179
(58) Field of Classification Search .................. 345/156, 345/173, 179, 180; 178/18.01; 382/291; 250/221
See application file for complete search history.

(56) References Cited

U.S. PATENT DOCUMENTS

| | | | | |
|---|---|---|---|---|
| 6,683,628 B1 * | 1/2004 | Nakagawa et al. | ............ | 715/799 |
| 6,802,611 B2 * | 10/2004 | Chu et al. | ................... | 353/28 |
| 7,502,018 B2 * | 3/2009 | Tamura | .................... | 345/179 |

\* cited by examiner

*Primary Examiner* — Abbas Abdulselam
(74) *Attorney, Agent, or Firm* — James David Johnson, P.A.; James David Johnson

(57) ABSTRACT

A large screen information interactive system and method are disclosed, including a computer 3, a projector 4, a pointer equipment 2, and an interactive whiteboard 1 including at least one display panel 6 on the same plane and at least one electronic writing board 5 used for sensing and receiving an operational signal of the pointer equipment 2. The at least one electronic writing board 5 is connected with the computer 3 through a serial port, a USB port, a wireless communication module, or a bluetooth module. The signal of the pointer equipment 2 collected from the electronic writing board 5 is processed by the computer 3. A processed displayed image is projected onto the interactive whiteboard 1 by the projector 4. When one point on the electronic writing board 5 is written, position and state information signals of the written point are transferred to the computer for converting, and the data is processed according to display attributes and operational commands. A whiteboard coordinate is converted into a screen coordinate corresponding to a display. A state of the pointer equipment 2 is converted into a mouse state, so as to updating the screen data. Screen signals are projected onto the interactive whiteboard 1 by the projector 4. Therefore, display and writing problems with an ultra-large screen are resolved, extending the application scope of the interactive whiteboard.

11 Claims, 3 Drawing Sheets

LARGE SCREEN INFORMATION INTERACTIVE SYSTEM AND METHOD OF USE

CROSS-REFERENCE TO RELATED PATENT APPLICATION

This application claims the priority of Chinese patent application No. 200710074960.2, filed Jun. 14, 2007; which is herewith incorporated by reference in its entirety.

FIELD OF THE INVENTION

The present invention relates to an interactive electronic whiteboard, and more particularly to a large screen information interactive system and method thereof.

BACKGROUND OF THE INVENTION

As an interactive demo system emerging in recent years, an interactive electronic whiteboard can save writing content on the electronic whiteboard very conveniently into a computer, do such works as editing, modifying, labeling screen content of the computer on the interactive electronic whiteboard, and control the computer. However, effective combination of display and writing of the ultra-large screen has not been realized with a prior interactive electronic whiteboard due to a limitation of human's writing height. In large screen display, if the entire display is used as a writing plane, a large-sized electronic writing board will be required that is high in cost and also inconvenient to operate. In other words, size of the plane of the writing board is also limited by such factors as cost, which makes the large-sized interactive whiteboard difficult to be well applied in large council chambers, report halls, large classrooms, etc. Therefore, advantages of the interactive electronic whiteboards cannot be efficiently presented in such places as large council chambers, report halls, and large classrooms.

SUMMARY OF THE INVENTION

The purpose of the present invention is to provide an improved interactive whiteboard, so as to resolve the above-mentioned technical problems with the prior art. The improved interactive whiteboard can have a larger size, while a user only writes on a smaller part therein, with the writing process and result displayed on the larger-sized whiteboard. Another purpose of the present invention is to provide a method for information interaction utilizing this interactive whiteboard.

The present invention provides a large screen information interactive system, including a computer 3, a projector 4, a pointer equipment 2, an interactive whiteboard 1 including at least one display panel 6 on the same plane and at least one electronic writing board 5 used for sensing and receiving an operational signal of the pointer equipment 2. The at least one electronic writing board 5 is connected with the computer 3 through a serial port, a USB port, a wireless communication module, or a bluetooth module. The signal of the pointer equipment 2 collected from the electronic writing board 5 is processed by the computer 3. A processed displayed image is projected onto the interactive whiteboard 1 by the projector 4.

In the above-mentioned system, the at least one electronic writing board 5 occupies ¼ or ⅑ of the entire rectangular interactive whiteboard 1, and the at least one electronic writing board and the at least one display panel constitute a rectangular projecting plane having a same length to width ratio with the electronic writing board.

In the above-mentioned system, the at least one display panel 6 is fixedly connected with the at least one electronic panel 6 respectively, while the display panels 6 are connected with each other through a fixing piece.

In the above-mentioned system, software of the computer 3 includes a core processing module, a data conversion module, a plotting and editing module, a display attribute selector, and a content display module. The core processing module is responsible for receiving the conversed data, and processing the data according to display attributes and operational commands. The data conversion module converts a whiteboard coordinate produced on the electronic writing whiteboard 5 into a screen coordinate corresponding to the display of the computer 3, and converts a state of the point equipment 2 into a mouse state of the computer 3. The plotting and editing module is responsible for processing user's plot and editing logic. The display attribute selector selects a template and a manner for displaying the content. The content display module displays the content onto the interactive whiteboard 1.

A large screen information interactive method provided according to the other aspect of the present invention, using a large screen including at least one electronic writing board and at least one display panel, includes the following steps:
1) writing one point on the electronic writing board 5;
2) transferring position and state information signal of the written point to the computer;
3) converting the received information signal by the computer, and processing the converted data according to current display attributes and operational commands;
4) converting a whiteboard coordinate of the written point on the electronic writing whiteboard 5 into a screen coordinate corresponding to the display of the computer 3;
5) converting a state of the point equipment 2 into a mouse state of the computer 3, and processing and updating screen data; and
6) projecting the processed and updated screen signal onto the interactive whiteboard 1 by the projector 4, wherein a projected image produced by the screen signal may overlay the entire interactive electronic whiteboard.

The above-mentioned method can further include a step of processing user's plot and editing logic in the plotting and editing mode.

The above-mentioned method can further include a step of selecting a template and a manner for displaying the content according to the display attribute selector.

The above-mentioned method can further include the following steps: copying or moving image data on the electronic writing board onto a local memory area corresponding to other display panels to get the image data displayed on such other display areas; and copying or moving data in the memory areas corresponding to the other display panels onto memory areas corresponding to the electronic writing board, so as to making an image on the display panel displayed onto the electronic writing board to enable the point equipment editing the image.

The above-mentioned method can further include a step of interchanging the image data on the electronic writing board with those on the display panel.

The above-mentioned method can further include a step of enlarging and expanding the image data on the electronic writing board onto the entire interactive whiteboard.

The following beneficial results can be obtained by using the large screen information interactive system and method described herein: compared with a prior interactive whiteboard system, the system and method described herein resolves display and writing problems with the ultra-large screen, and only uses one projector to realize displaying multiple pages at the same time without affecting writing of normal pages, thus promoting application scope of the interactive whiteboard, prolonging display time of spoken content on the interactive whiteboard, and facilitating reviewing the content.

BRIEF DESCRIPTION OF THE DRAWINGS

The present invention will be further explained with reference to drawings and embodiments.

DETAILED DESCRIPTION OF THE INVENTION

Figure 1:
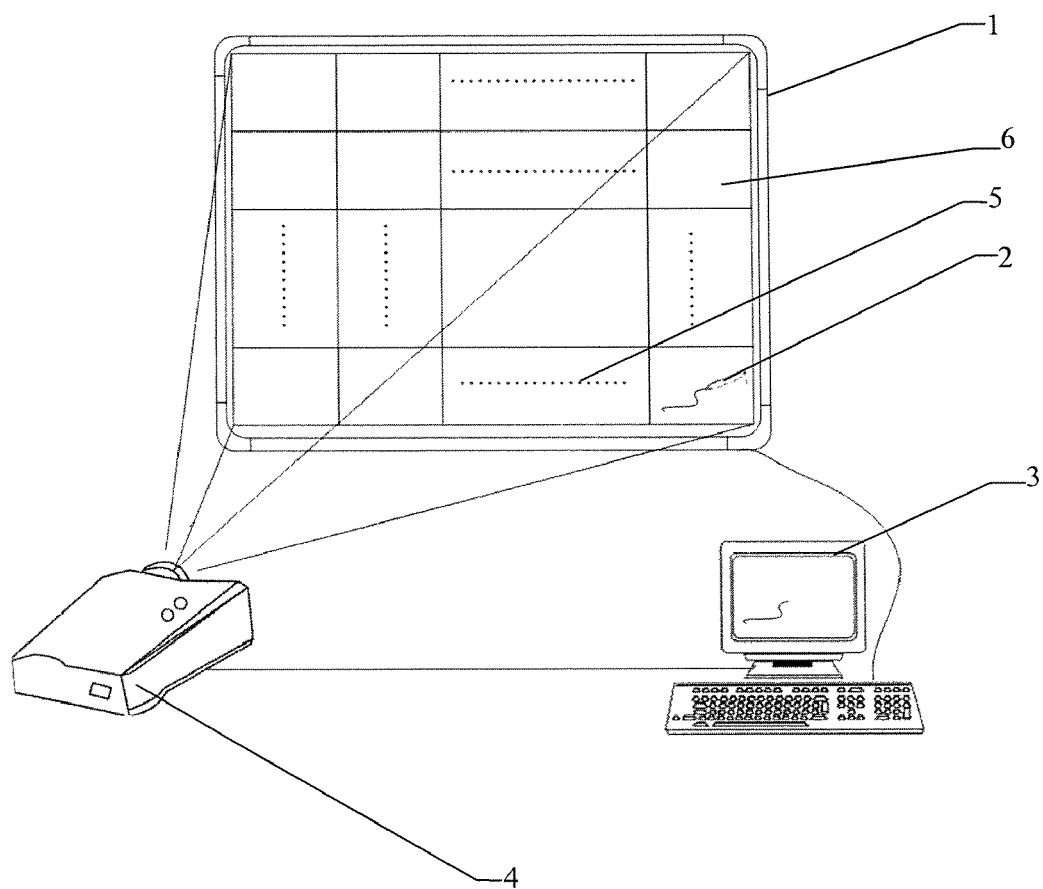
FIG. 1 is a structural schematic view of an embodiment of the large screen information interactive system of the present invention.
Figure 2:
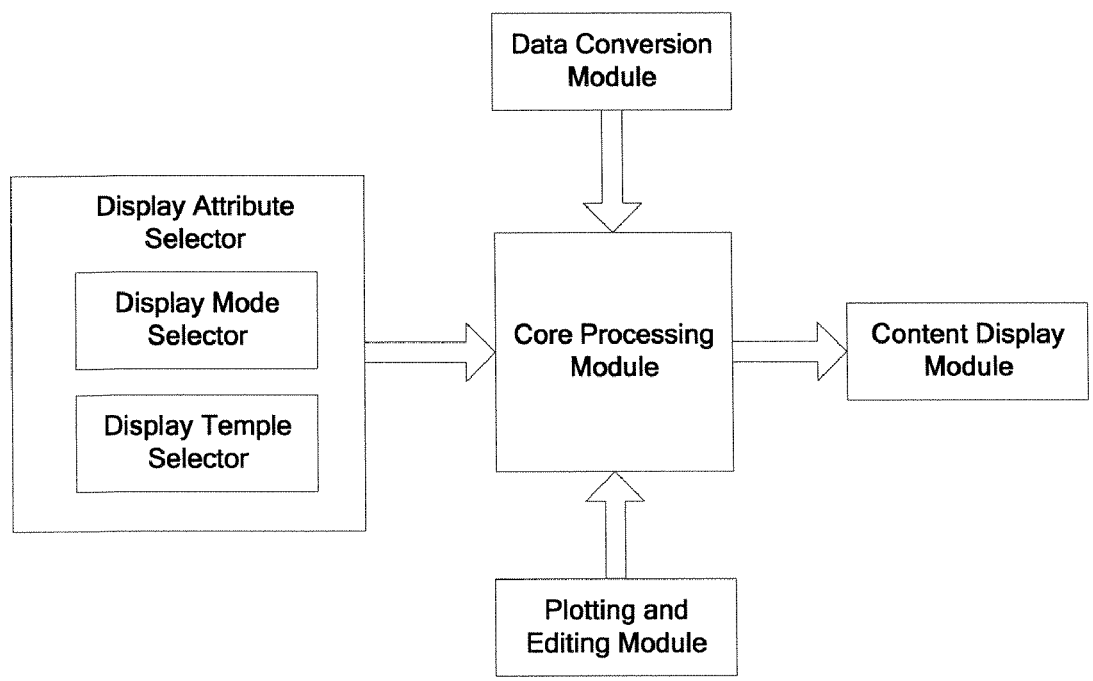
FIG. 2 is a software implementation block diagram of an embodiment of the large screen information interactive method of the present invention.
Figure 3:
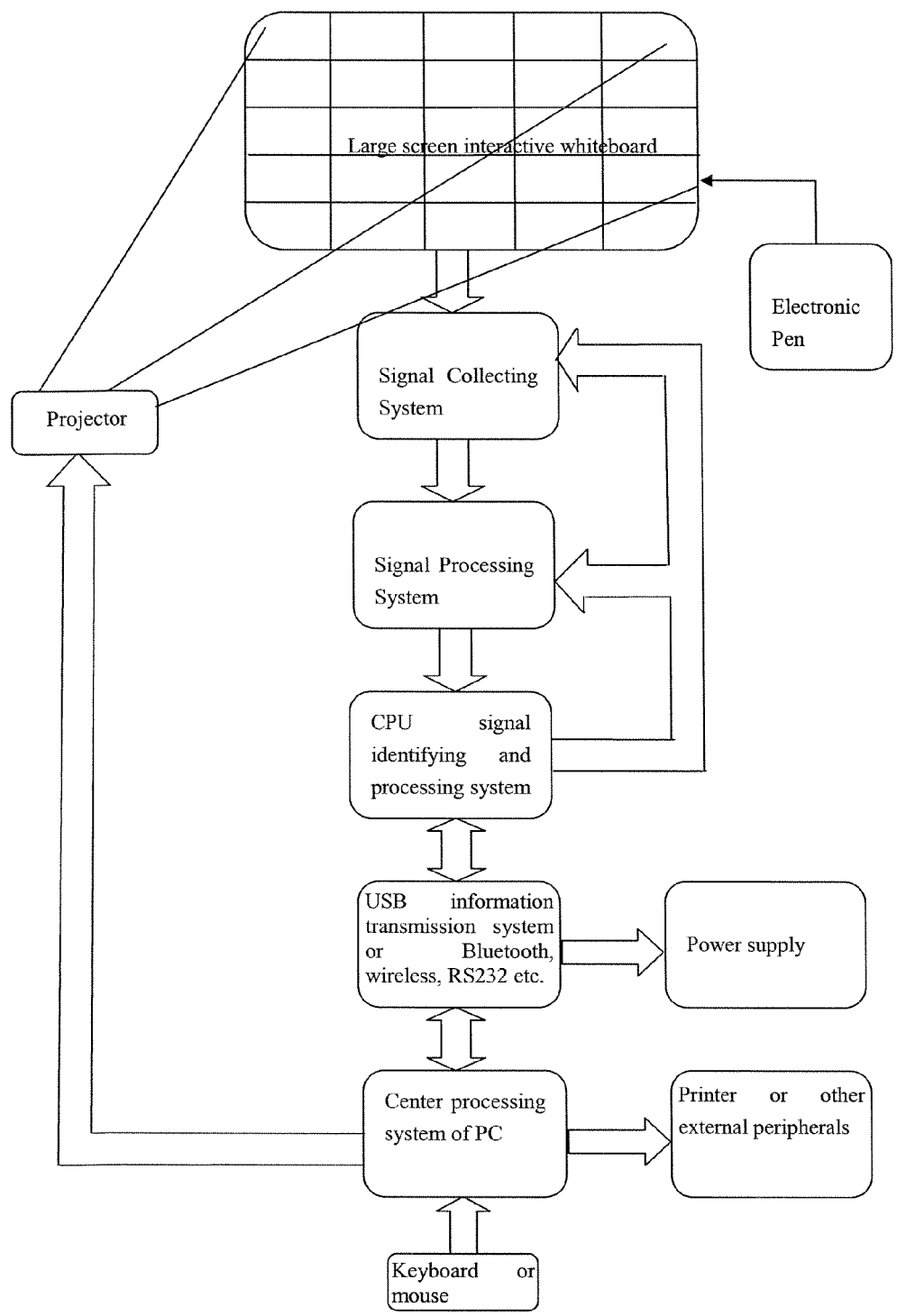
FIG. 3 is a flowchart of an embodiment of a large screen information interactive method of the present invention.

In embodiments of the large screen information interactive system of the present invention as shown in FIGS. 1 to 3, the large screen therein, i.e. the interactive whiteboard 1, is used as a projection screen, which includes a plurality of electronic writing boards 5 and a plurality of display panels 6. The electronic writing boards 5 are generally positioned in a place convenient for writing, while the display panels 6 can be positioned above, below, or to the left or right of the electronic whiteboard, etc. For the sake of convenience, the electronic writing boards and the display panels have the same length to width ratio with the projected image, such as 4:3. If the large screen interactive whiteboard is totally composed of 2×2=4, 3×3=9, or 4×4=16 pieces of boards, the electronic writing board can be positioned in the lower left or right corner, with the rest positions used only as display panels of the projection whiteboard. The display panels and the electronic writing boards can be fixedly mounted onto a backing plate in an assembly approach, or combined with each other directly.

A prior product using such technologies as acoustic surface wave, infrared sensing, or resistance-pressure sensitivity can be used as the electronic writing board 5 in the interactive whiteboard 1. The pointer equipment 2 is an electronic or non-electronic pen, a pointer or finger cooperating with the electronic writing board 5. The electronic writing board 5 is connected with the computer 3 through a serial port, a USB port, a wireless communication module, or a bluetooth module. When a user writes or operates on one or more electronic writing boards 5 using the pointer equipment 2 cooperating with the electronic writing board 5, the electronic writing board 5 detects and identifies its operational signal through a signal collecting system, a signal processing system and a CPU signal identifying and processing system, and transfers the operational signal to the connected computer 3 through a serial port, a USB port, a wireless communication module, or a bluetooth module. A data conversion module of the software of the computer 3 converts a coordinate of the electronic writing board 5 into a coordinate of the computer screen, and converts a state of the pointer equipment 2 into a mouse state of the computer, and transfers the conversion results to a core processing module. A plotting and editing module sends such operational commands as plotting and editing to the core processing module. A display mode selector in a display attribute selector selects a display mode for the content, and a display template selector selects a display template for the content. The display mode and the display template are transferred to the core processing module. The core processing module calculates and processes the data according to the operational command, the display template, and the display mode, and transfers the processed result to a content display module. The content can be displayed onto the interactive whiteboard 1 through the projector 4 by the content display module, and also can be printed through a printer, or output through other peripherals. While writing and operating, pages currently being written and operated can only be displayed onto the writing board in a screen splitting mode, realizing a simultaneous display of multiple pages. After finishing writing, we can either select any one of these pages through software to edit the page and adjust the display position, or display the selected page on a full screen, so as to attain enlarged effect of the selected page. When a user has finished writing and operating the current page and writes and operates on the next page, the display position of the finished page is set by a software, and this setting can be changed if necessary, so as to display the finished page onto any of such positions as the upper, lower, left or right part of the interactive whiteboard 1, thus having flexibility of the display positions. Besides, operation can be performed on any one or more electronic writing boards 5, and thus the computer 3 can be operated directly. The computer 3 in this system can run one or more application programs in a conventional mode.

When a user writes or operates on one or more electronic writing boards using the pointer equipment of the electronic writing board, the electronic writing board detects and identifies its operational signal through a signal collecting system, a signal processing system and a CPU signal identifying and processing system, and transfers the operational signal to the connected computer through a serial port, a USB port, a wireless communication module, or a bluetooth module. The data conversion module of the software of the computer converts the coordinate of the electronic writing board into the coordinate of the computer screen, and converts the state of the pointer equipment into the mouse state of the computer, and transfers the conversion result to the core processing module. The plotting and editing module sends such operational commands as plotting and editing to the core processing module. The display mode selector in the display attribute selector selects a display mode for the content. The display template selector selects a display template for the content. The display mode and the display template are transferred to the core processing module. The core processing module calculates and processes the data according to the operational command, the display template, and the display mode, and transfers the processed result to the content display module. The content can be displayed onto the interactive whiteboard through the projector by the content display module, and can be printed through a printer, or output through other peripherals. When a user has finished writing and operating the current page and starts writing and operating on the next page, the finished page can be displayed automatically or passively onto any of such positions as the upper, lower, left or right part of the interactive whiteboard, thus attaining the purpose of simultaneously displaying a plurality of pages. Besides, operation can be performed on any one or more electronic writing boards, and thus the computer can be operated directly. The computer in this system can run one or more application programs in a conventional mode.

What is claimed is:

1. A large screen information interactive system, comprising:
   a computer;
   a projector;
   a pointer equipment; and
   an interactive whiteboard comprising at least one display panel on the same plane and at least one electronic writing board used for sensing and receiving an operational signal of the pointer equipment;

wherein the at least one electronic writing board is connected with the computer through a serial port, a USB port, a wireless communication module, or a bluetooth module; the signal of the pointer equipment collected from the electronic writing board is processed by the computer;

and a processed displayed image is projected onto the interactive whiteboard by the projector;

wherein software of the computer comprises a core processing module, a data conversion module, a plotting and editing module, a display attribute selector, and a content display module, wherein the core processing module is responsible for receiving conversed data and processing the data according to display attributes and operational commands; the data conversion module converts a whiteboard coordinate produced on the electronic writing whiteboard into a screen coordinate corresponding to a display of the computer as well as a state of the pointer equipment into a mouse state of the computer; the plotting and editing module is responsible for processing user's plot and editing logic; the display attribute selector selecting a template and a mode for displaying the content; the content display module displays the content onto the interactive whiteboard.

2. The large screen information interactive system according to claim 1, wherein the at least one electronic writing board occupies ¼ or ⅑ of the entire rectangular interactive whiteboard, and the at least one electronic writing board and the at least one display panel constitute a rectangular projecting plane having a same length to width ratio with the electronic writing board.

3. The large screen information interactive system according to claim 2, wherein software of the computer comprises a core processing module, a data conversion module, a plotting and editing module, a display attribute selector, and a content display module, wherein the core processing module is responsible for receiving conversed data and processing the data according to display attributes and operational commands; the data conversion module converts a whiteboard coordinate produced on the electronic writing whiteboard into a screen coordinate corresponding to a display of the computer as well as a state of the pointer equipment into a mouse state of the computer; the plotting and editing module is responsible for processing user's plot and editing logic; the display attribute selector selecting a template and a mode for displaying the content; the content display module displays the content onto the interactive whiteboard.

4. The large screen information interactive system according to claim 1, wherein the at least one display panel and the at least one electronic writing board are fixedly connected, respectively, and the display panels are connected with each other through a fixing piece.

5. The large screen information interactive system according to claim 2, wherein the at least one display panel and the at least one electronic writing board are fixedly connected, respectively, and the display panel are connected with each other through a fixing piece.

6. A large screen information interactive method, wherein the electronic whiteboard comprises at least one electronic writing board and at least one display panel, the method comprising the following steps:

1) writing one point on the electronic writing board;
2) transferring position and state information signal of the written point to the computer;
3) converting the received information signal by the computer, and processing the converted data according to current display attributes and operational commands;
4) converting a coordinate of the written point on the electronic writing whiteboard into a screen coordinate corresponding to the display of the computer;
5) converting a state of the pointer equipment into a mouse state of the computer, and processing and updating screen data; and
6) projecting the processed and updated screen signal onto the interactive whiteboard by the projector, wherein a projected image produced by the screen signal may cover the entire interactive electronic whiteboard.

7. The method according to claim 6, wherein the method further comprises a step of processing user's plot and editing logic in a plotting and editing mode.

8. The method according to claim 6, wherein the method further comprises a step of selecting a template and a mode for displaying the content according to the display attribute selector.

9. The method according to claim 6, wherein the method further comprises the following steps: copying or moving image data on the electronic writing board onto a local memory area corresponding to other display panels to get the image data displayed on such other display areas; and copying or moving data in the memory areas corresponding to the other display panels onto memory areas corresponding to the electronic writing board, so as to making an image on the display panel displayed onto the electronic writing board to enable the point equipment editing the image.

10. The method according to claim 6, wherein the method further comprises a step of interchanging the image data on the electronic writing board with those on the display panel.

11. The method according to claim 6, wherein the method further comprises a step of enlarging and expanding the image data on the electronic writing board to the entire interactive whiteboard.

* * * * *